United States Patent [19]
Iino et al.

[11] Patent Number: 5,785,623
[45] Date of Patent: Jul. 28, 1998

[54] HYDRAULIC/MECHANICAL TRANSMISSION

[75] Inventors: Takashi Iino; Mikihiro Takano; Akihito Okuda, all of Saitama, Japan

[73] Assignee: Honda Giken Kogyo Kabushiki Kaisha, Tokyo, Japan

[21] Appl. No.: 520,342

[22] Filed: Aug. 28, 1995

[30] Foreign Application Priority Data

Aug. 31, 1994 [JP] Japan ................................ 6-206649

[51] Int. Cl.$^6$ .......................................................... F16H 3/72
[52] U.S. Cl. ............................................ 475/72; 475/80; 475/82
[58] Field of Search .......................... 475/72, 80, 82, 475/78, 79; 74/730.1

[56] References Cited

U.S. PATENT DOCUMENTS

| | | | |
|---|---|---|---|
| 3,675,507 | 7/1972 | Takekawa | 475/81 |
| 4,313,351 | 2/1982 | Hagin | 475/80 |
| 4,750,381 | 6/1988 | Kita et al. | 475/80 |
| 4,813,306 | 3/1989 | Kita et al. | 475/80 |
| 5,193,416 | 3/1993 | Kanayama | 475/72 X |
| 5,230,519 | 7/1993 | Nishimura et al. | 475/83 |
| 5,542,307 | 8/1996 | Hasegawa et al. | 74/730.1 X |
| 5,544,547 | 8/1996 | Ishimaru | 74/730.1 |
| 5,584,772 | 12/1996 | Hayd | 475/72 |

FOREIGN PATENT DOCUMENTS

| | | |
|---|---|---|
| 0235466 | 9/1987 | European Pat. Off. |
| 62-147148 | 7/1987 | Japan. |
| 1161508 | 8/1969 | United Kingdom. |
| WO 90/10807 | 9/1990 | WIPO. |

*Primary Examiner*—Khoi Q. Ta
*Assistant Examiner*—Peter T. Kwon
*Attorney, Agent, or Firm*—Lyon & Lyon LLP

[57] ABSTRACT

A hydraulic/mechanical transmission device for providing variable speed change ratios with a decreased number of parallel shafts and a simplified and compact structure. A hydrostatic continuously variable transmission includes a hydraulic pump 24 with a pump cylinder block 28 and a hydraulic motor 25 with a motor cylinder block 34. An input shaft 9 and first and second output shafts $10_1$ and $10_2$ of a power dividing device 3 are coaxially disposed. The first output shaft $10_1$, is coaxially connected to the pump cylinder block 28 of the hydraulic pump 24. A power collecting shaft 17 is disposed parallel to the first and second output shafts $10_1$ and $10_2$ and coaxially connected to the motor cylinder block 34 of the hydraulic motor 25.

6 Claims, 2 Drawing Sheets

Combined speed ratio e $$e = \frac{\text{Number of revolutions of differential case 22}}{\text{Number of revolutions of input shaft 9}}$$

HYDRAULIC/MECHANICAL TRANSMISSION

The present invention relates to a hydraulic/mechanical transmission device for transmitting power from a prime mover to an output, such as from a vehicle engine to the vehicle wheels, by both a hydraulic transmission and a mechanical transmission with variable speed change ratios.

A well-known hydrostatic continuously variable transmission device that includes a hydraulic pump and a hydraulic motor, which are in communication with each other through a hydraulic closed circuit and at least one of which is constructed into a variable displacement type, is used in various industrial machines and vehicles. However, although such a hydrostatic continuously variable transmission is excellent in providing continuously variable speed ratio changes in the power transmitted, it is not necessarily of good efficiency in transmitting power whereby it is unsuitable for a vehicle in which the specific fuel consumption is an important consideration.

Therefore, in order to improve the power transmitting efficiency, a hydraulic/mechanical power transmitting device has been conventionally proposed (see Japanese Patent Application Laid open No. 147148/87), which is designed to transmit power from the prime mover by the cooperation of a hydrostatic continuously variable transmission having an excellent continuously variable speed ratio transmittability and a mechanical power transmitting device having an excellent power transmitting efficiency. With such a transmitting device, it is possible to enhance the power transmitting efficiency, while maintaining the continuously variable speed ratio transmittability.

However, in the hydraulic/mechanical transmission device disclosed in the above-cited patent, the input shaft supplied with the power from the prime mover, the pump shaft of the hydraulic pump, the motor shaft of the hydraulic motor and the power collecting shaft for collecting the power supplied in a divided manner by the hydraulic system and the mechanical system are all independently disposed in parallel to one another, and hence, there is a disadvantage that the number of parallel shafts is increased, resulting in a complicated and large-sized structure.

The present invention has been accomplished with such circumstance in view, and it is an object of the present invention to provide a hydraulic/mechanical transmission device and system in which the number of parallel shafts is small and which has a simple and compact structure.

To achieve the above object, according to a first aspect and feature of the present invention, there is provided a hydraulic/mechanical transmission device, comprising; a power dividing device including an input shaft and a pair of first and second output shafts for dividing power supplied from a prime mover to the input shaft so as to transmit the same to both the output shafts; a hydrostatic continuously variable transmission including a hydraulic pump driven by power delivered from the first output shaft, a hydraulic motor which is in communication with the hydraulic pump through a hydraulic closed circuit, and a control plate in which the hydraulic closed circuit is formed, at least one of the hydraulic pump and the hydraulic motor being of a variable displacement type; a mechanical transmission device connected to the second output shaft; and a power collecting shaft for collecting power delivered from both the mechanical transmission device and the hydraulic motor to supply them to a load, wherein the input shaft and the first and second output shafts of the power dividing device are coaxially disposed, the first output shaft being coaxially connected to a pump cylinder of the hydraulic pump, and the power collecting shaft being disposed parallel to the first and second output shafts and coaxially connected to a motor cylinder of the hydraulic motor.

According to a second aspect and feature of the present invention, in addition to the above first feature, the power dividing device, the mechanical transmission device and the power collecting shaft are accommodated in a common casing to constitute a mechanical transmission unit, and the control plate is disposed between the mechanical transmission unit and the hydraulic pump as well as the hydraulic motor in order to rotatably support the first output shaft and the power collecting shaft.

According to a third aspect and feature of the present invention, in addition to the first and second features, a differential is connected to the power collecting shaft and accommodated in the casing of the mechanical transmission unit, the differential being disposed parallel to the power collecting shaft, such that either the left or right wheel driving shaft extending from the differential passes along an outer periphery of the continuously variable transmission.

DESCRIPTION OF A PREFERRED EMBODIMENT

A preferred embodiment of the present invention will now be described with reference to the accompanying drawings.

Figure 1:
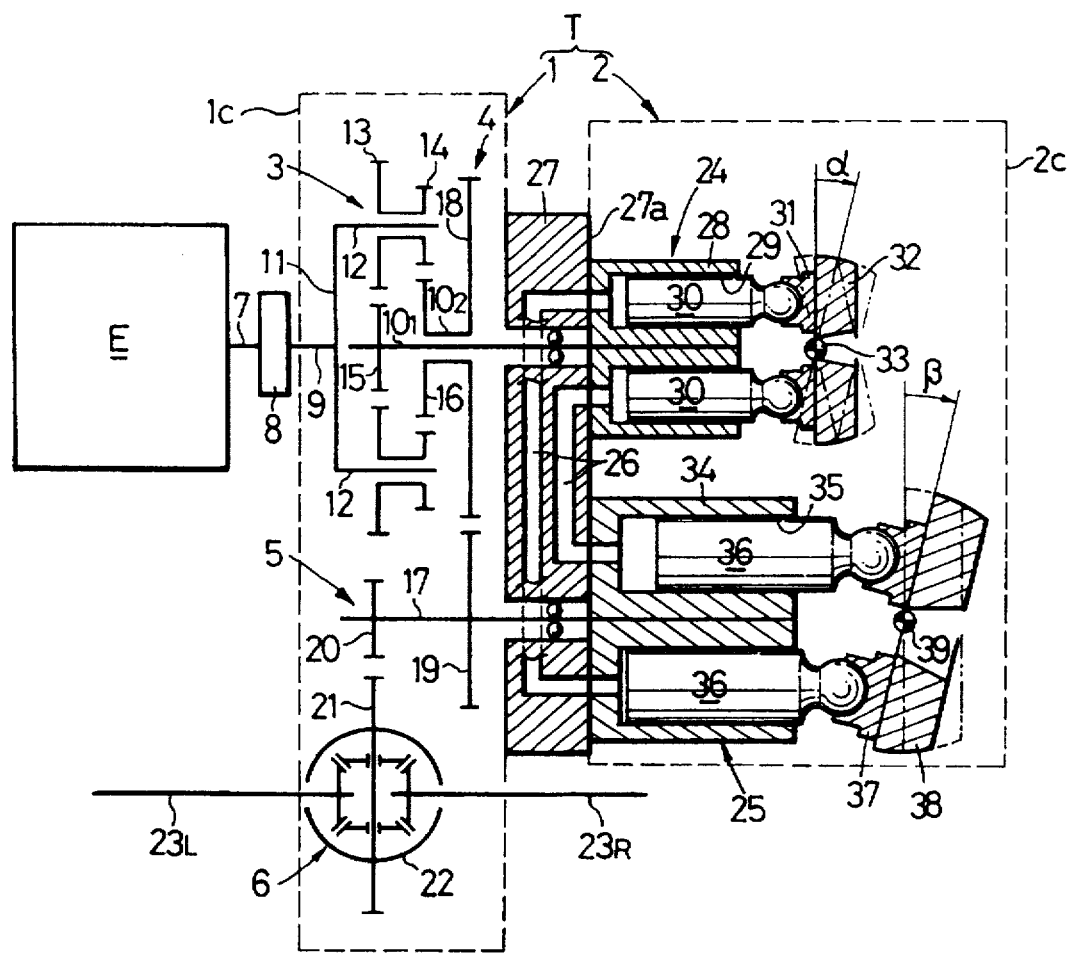
FIG. 1 is a diagrammatic illustration of a hydraulic/mechanical transmission device and system for a vehicle according to a preferred embodiment of the present invention.

In FIG. 1, a hydraulic/mechanical transmission device T of this invention is illustrated for a front engine and front drive type or rear engine and rear drive type vehicle. The hydraulic/mechanical transmission device T includes a mechanical transmission unit 1 and a hydrostatic continuously variable transmission 2. An engine E as a prime mover is disposed on one side of the mechanical transmission unit 1, and the hydrostatic continuously variable transmission 2 is disposed on the other side of the mechanical transmission unit 1.

The mechanical transmission unit 1 includes a power dividing device 3, a mechanical transmission device 4, a power collecting shaft 17, a speed-reducing device 5 and a differential 6, which are all contained within a common first casing 1c.

The power dividing device 3 is constructed into a planetary gear type, and includes an input shaft 9 connected to a crankshaft 7 of the engine E via a torque damper 8, a first output shaft $10_1$ which is coaxially in line with the input shaft 9, and a second output shaft $10_2$ which concentrically surrounds the first output shaft $10_1$. A carrier 11 is fixedly mounted to the input shaft 9 and has a plurality of pinion shafts 12 on its outer periphery, which are parallel to the input shaft 9. A pair of larger and smaller diameter pinion gears 13 and 14 coupled to each other are rotatably carried on each of the pinion shafts 12. A smaller diameter sun gear 15 is fixedly mounted on the first output shaft $10_1$ and meshed with the larger diameter pinion gear 13. A larger diameter sun gear 16 is fixedly mounted in the output shaft $10_2$ and meshed with the smaller diameter pinion gear 14.

The mechanical transmission unit 1 includes a gear 18 which is fixedly mounted on the second output shaft $10_2$ and a gear 19 which is fixedly mounted on the power collecting shaft 17 and meshed with the gear 18. The power collecting shaft 17 is disposed in parallel with the first and second output shafts $10_1$, and $10_2$.

The speed reducing device 5 includes a smaller diameter gear 20 fixedly mounted on the power collecting shaft 17, and a larger diameter gear 21 which is fixedly mounted on the differential case 22 of the differential 6 and is meshed with the smaller diameter gear 20.

The differential 6 is conventionally well-known and designed to distribute power transmitted to the differential case 22 from the larger diameter gear 21 to left and right wheel driving shafts $23_L$ and $23_R$. The differential 6 is disposed in parallel to the power collecting shaft 17, so that one of the wheel driving shafts $23_L$ and $23_R$ extends along an outer periphery of the continuously variable transmission 2, e.g., shaft $23_R$ extends below the continuously variable transmission 2 in the illustrated embodiment.

The continuously variable transmission 2 includes a hydraulic pump 24, a hydraulic motor 25, and a control plate 27 in which a hydraulic closed circuit 26 which connects the hydraulic pump 24 and the hydraulic motor 25 to each other is formed. The control plate 27 is secured to one side of a first casing 1c adjacent the mechanical transmitting unit 1 and rotatably supports the first output shaft $10_1$ and the power collecting shaft 17. Accordingly, the control plate 27 is disposed between the mechanical transmitting unit 1 and the hydraulic pump 24 and the hydraulic motor 25.

The hydraulic pump 24 is constructed in a variable displacement type, and includes a pump cylinder block 28 coaxially connected to the first output shaft $10_1$, and rotatably and slidably disposed on a hydraulic pressure dispensing surface 27a of the control plate 27, a large number of pump plungers 30 are slidably fitted respectively in a large number of cylinder bores 29 provided in an annular arrangement in the pump cylinder block 28 to surround the axis of thereof, and a pump swash plate 32 which is tiltable at a variable angle and against which a shoe 31 oscillatably mounted at a tip end of each of the pump plungers 30 slidably abuts. Specifically, the pump swash plate 32 is capable of being turned about a trunnion shaft 33 disposed perpendicular to the axis of the pump cylinder block 28 between a righted position in which the pump swash plate 32 intersects the axis of the pump cylinder block 28 at right angles, and a tilted-down position in which the pump swash plate is tilted down at a predetermined maximum inclination with respect to the axis of the pump cylinder block 28. If the inclination angle α from the righted position of the pump swash plate 32 is increased, the reciprocating stroke of each of the pump plungers 30 can be increased.

The hydraulic motor 25 is also constructed in a variable displacement type, and includes a motor cylinder block 34 coaxially connected to the power collecting shaft 17 and rotatably and slidably disposed on a hydraulic pressure dispensing surface 27a of the control plate 27, a large number of motor plungers 36 are slidably fitted respectively in a large number of cylinder bores 35 provided in the motor cylinder block 34 to surround an axis of the motor cylinder block 34, and a motor swash plate 38 against which a shoe 37 oscillatably mounted at a tip end of each of the motor plungers 36 slidably abuts. Specifically, the motor swash plate 38 is capable of being turned about a trunnion shaft 39 disposed perpendicular to the axis of the motor cylinder 34 between a righted position in which the motor swash plate 38 intersects the axis of the motor cylinder 34 at right angles, and a tilted-down position in which the motor swash plate 38 is tilted down at a predetermined maximum inclination with respect to the axis of the motor cylinder block 34. If the inclination angle β from the righted position of the motor swash plate 38 is increased, the reciprocating stroke of each of the motor plungers 36 can be increased. The second casing 2c, in which the hydraulic pump 24 and the hydraulic motor 25 are contained, is secured to the control plate 27.

The operation of the first embodiment of the present invention will now be described.

When the power from the engine E is supplied from the crankshaft 7 via the torque damper 8 to the input shaft 9 and thus to the carrier 11, the power is provided to the larger and smaller diameter pinion gears 13 and 14, and the power transmitted to the larger diameter pinion gear 13 is transmitted through the smaller diameter sun gear 15 via the first output shaft $10_1$ to the pump cylinder block 28 to drive the pump cylinder block 28.

At this time, if the pump swash plate 32 and the motor swash plate 38 are in their inclined states in which they have been inclined at an appropriate angle from their righted positions, the pump plunger is moved in one reciprocation for one rotation of the pump cylinder block 28 in the cylinder bore 29 with a stroke corresponding to the inclination angle α of the pump swash plate 32, thereby performing discharging and sucking motions. Therefore, the hydraulic pressure discharged from each cylinder bore 29 is transferred via a higher pressure side of the hydraulic closed circuit 26 to the corresponding cylinder bore 35 of the motor cylinder block 34 to provide an expanding motion to the corresponding motor plunger 36. When such plunger 36 urges the motor swash plate 38, a component, in a rotation direction, of a reaction force against such urging causes the motor cylinder block 34 to be rotated through the plunger 36. Then, the motor swash plate 38 provides the contraction motion to each motor plunger 36 which has finished the expansion task, so that the hydraulic pressure discharged from the corresponding cylinder bore 35 is drawn via the lower pressure side of the hydraulic closed circuit 26 into the cylinder bore 29 of the pump plunger 30 which performs the suction motion. In this manner, in the hydraulic motor 25, the motor plunger 36 is reciprocated with a stroke corresponding to the inclination angle β of the motor swash plate 38. For one reciprocation of the motor plunger 36, the motor cylinder block 34 is rotated in one rotation, and the torque thereof is transmitted to the power collecting shaft 17.

The displacement of each of the hydraulic pump 24 and the hydraulic motor 25 is determined by the stroke of the corresponding plunger 30, 36, i.e., the angle α, β of the swash plate 32, 38, and the gear ratio of the continuously variable transmission 2 can be controlled continuously by varying the angles α, β of the swash plates 32, 38.

The power transmitted to the smaller diameter pinion gear 14 is transmitted through the larger diameter sun gear 16 to the second output shaft $10_2$ and further transmitted via the mechanical transmitting device 4, i.e., the gears 18 and 19 to the power collecting shaft 17.

In this manner, one of the power components resulting from division of the power from the engine E by the power dividing device 3 is continuously varied by the hydrostatic continuously variable transmission 2 and then transmitted to the power collecting shaft 17. The other of the power components is efficiently transmitted to the power collecting shaft 17 by the mechanical transmitting device 4. Therefore, the transmitting of the power can be carried out, while satisfying both performances of a continuously variable transmission property and a transmitting efficiency.

Then, the power components joining each other at the power collecting shaft 17 are transmitted via the speed reducing device 5 to the differential 6, where they are dispensed to the left and right wheel driving shafts $23_L$ and $23_R$.

The relationship between the angles α, β of the swash plates 32, 38 and the combined speed ratio in the hydraulic/mechanical transmitting system T will now be discussed with reference to FIG. 2.

Figure 2:
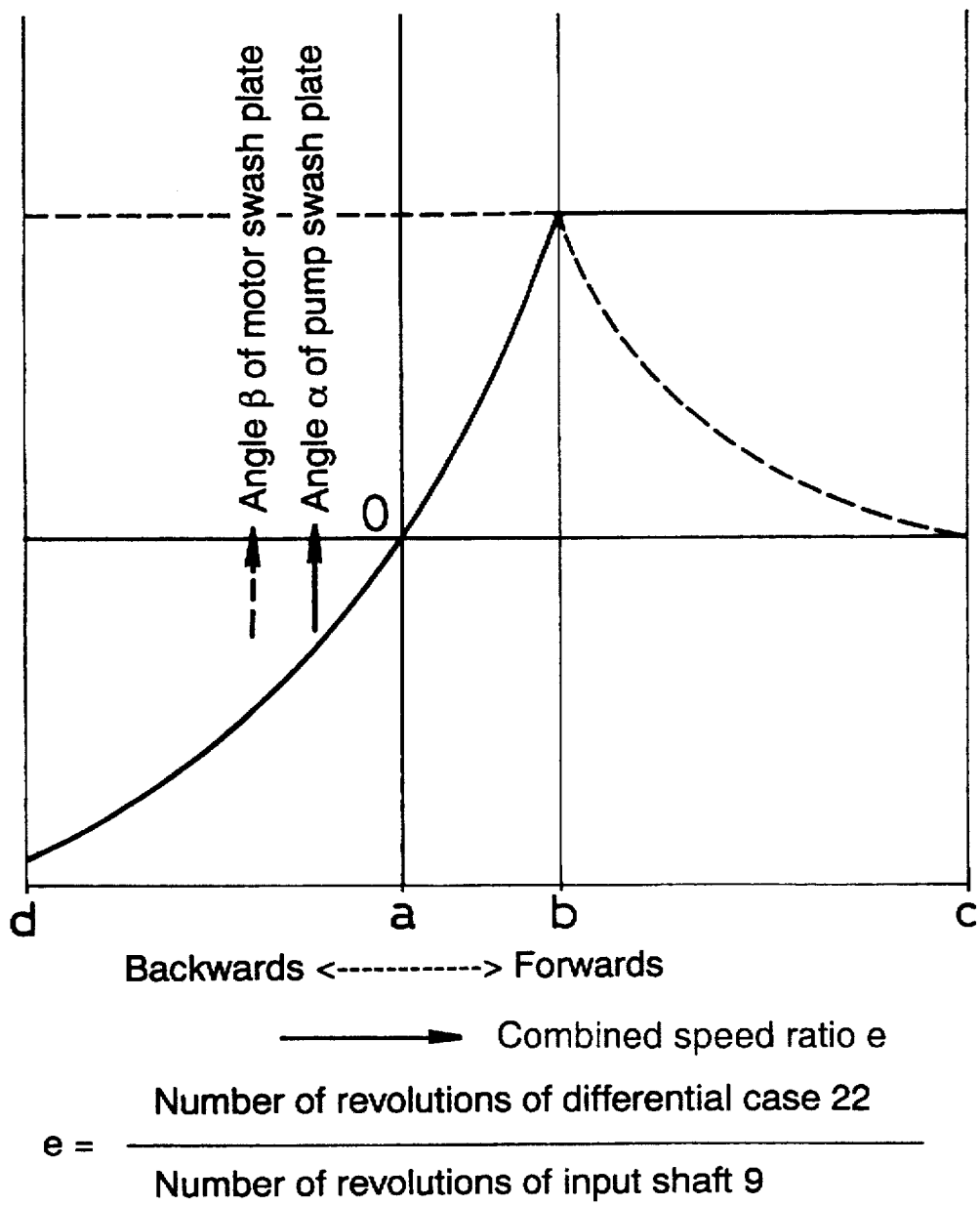
FIG. 2 is a diagram which shows the relationship between the angle of the swash plate and the combined speed ratio in a hydrostatic continuously variable transmission in the hydraulic/mechanical transmission of FIG. 1.

In the diagram in FIG. 2, the combined speed ratio e is taken on the axis of abscissas, and the inclination angles α and β of the pump swash plate 32 and the motor swash plate 38 are taken on the axis of ordinates. The combined speed ratio is the number of revolutions of the differential case 22 divided by the revolutions of the input shaft 9.

(1) combined speed ratio e=a

When the combined speed ratio e=a, the inclination angle α of the pump swash plate 32 and the inclination angle β of the motor swash plate 38 are controlled to 0 (zero) and β max, respectively. The displacement of the hydraulic pump 24 becomes zero as a result of αa=0. Therefore, even if the pump cylinder 28 is driven from the first output shaft $10_1$, the pump plunger 30 does not stroke, so that the hydraulic pressure cannot be generated in the hydraulic closed circuit 26, and therefore the hydraulic motor is not operated. Accordingly, all the engine power supplied to the input shaft 9 is completely spent for idling of the substantially unloaded pump cylinder 28. The second output shaft $10_2$ is not rotated and hence, the power collecting shaft 17 is also not rotated. As a result, the combined speed ratio e is equal to 0 (zero), i.e. the reduction ratio is an infinity.

(2) combined speed ratio e=a value between a to b

When the combined speed ratio e=a value between a to b, this condition corresponds to a region where the inclination angle α of the pump swash plate 32 is gradually increased up to α max, while the inclination angle β of the motor swash plate 38 remains maintained at β max. Specifically, the displacement of the hydraulic pump 24 is increased in accordance with an increase of the angle α, and in response to this, the hydraulic motor 25 is operated, and at the same time, the transmission of the power to the second output shaft $10_2$ is started. As a result, the combined speed ratio e is increased.

(3) combined speed ratio e=a value between b to c

When the combined gear ratio e=a value between b to c, this condition corresponds to a region in which the angle β of the motor swash plate 38 is gradually reduced from β max to 0, while the angle α of the pump swash plate 32 remains maintained at α max. The displacement of the hydraulic motor 25 is decreased due to the reduction in angle β and for this reason, the rotational speed of the pump cylinder block 28 is gradually reduced by an increase in load on the hydraulic pump 24 and stopped when β=0. Conversely, the rotational speed of the second output shaft $10_2$ is gradually increased and hence, the combined speed ratio e is maximum when β=0 at c.

(4) combined speed ratio e=a value between a to d

When the combined speed ratio e=a value between a to d, this condition corresponds to a region in which the pump swash plate 32 is tilted from the position of α=0 in a negative direction, i.e., from the righted position in a direction opposite from that during the forward travel of the vehicle. In this region, the direction of discharge of the hydraulic pressure to the hydraulic closed circuit 26 of the hydraulic pump 24 is opposite and for this reason, the higher pressure side and the lower pressure side in the hydraulic closed circuit 26 are inverted from those during the forward travel of the vehicle, so that the motor cylinder block 34 can be reversed, thereby reversing the direction of rotation of the wheel driving shafts $23_L$ and $23_R$.

In such hydraulic/mechanical transmission device T, the input shaft 9 and the first and second output shafts $10_1$ and $10_2$ of the power dividing device 3 are coaxially disposed, and the first output shaft $10_1$, is coaxially connected to the pump cylinder block 28. In addition, the power collecting shaft 17 is parallel to the first and second output shafts $10_1$ and $10_2$ and is coaxially connected to the motor cylinder block 34. Therefore, the first output shaft $10_1$ also can be used as a pump shaft, and the power collecting shaft 17 also can be used as a motor shaft, thereby substantially decreasing the number of parallel shafts to provide a simplification and reduction in size of the structure.

Moreover, the first output shaft $10_1$ and the power collecting shaft 17 are supported by the control plate 27 disposed between the mechanical transmitting unit 1 and the hydraulic pump 24 and the hydraulic motor 25, respectively, and therefore the supporting structure is simplified, and the flexure of its shaft can be effectively inhibited.

Additionally, the mechanical transmission unit 1 is constructed of the power dividing device 3, the mechanical transmission device 4, the power collecting shaft 17, the speed reducing device 5 and the differential 6 which are accommodated in the common first casing 1c. In this case, the differential 6 is disposed parallel to the power collecting shaft 17 so that one of the left and right wheel driving shafts $23_L$ and $23_R$ passes along the outer periphery of the continuously variable transmission 2. Therefore, it is possible to provide a reduction in size of the mechanical transmission unit 1, while avoiding interference of the wheel driving shafts and the continuously variable transmission 2 with each other.

In the above-described embodiment, various modifications in design may be made without departing from the spirit and scope of the invention. For example, the power dividing device 3 is not limited to the planetary gear type, and another type of a power dividing device may be used. In addition, the mechanical transmission device 4 may be constructed of a wrapping connector type using a chain or a belt. Further, the engine E may be replaced by an electric motor.

Summarizing the features of the invention, according to above-mentioned first feature of the present invention, the input shaft and the first and second output shafts of the power dividing device are disposed coaxially with each other, and the first output shaft is connected coaxially to the pump cylinder of the hydraulic pump. The power collecting shaft is disposed in parallel with the first and second output shafts, and the power collecting shaft is coaxially connected to the motor cylinder of the hydraulic motor. Therefore, the first output shaft also serves as the pump shaft of the hydraulic pump, and the power collecting shaft also serves as the motor shaft of the hydraulic motor. Thus, it is possible to provide the complicated transmission device in a compact structure.

According to the second feature of the present invention, the power dividing device, the mechanical transmission device and the power collecting shaft are accommodated in the common casing to constitute the mechanical transmission unit, and the control plate is disposed between the mechanical transmission unit and the hydraulic pump as well as the hydraulic motor in order to rotatably support the first output shaft and the power collecting shaft. Therefore, the control plate can be utilized to effectively inhibit the flexure of the first output shaft and the power collecting shaft, thereby providing an excellent strength and durability.

According to the third feature of the present invention, the differential is connected to the power collecting shaft and accommodated in the casing of the mechanical transmission unit, and the differential is disposed parallel to the power collecting shaft, so that one of the left and right wheel driving shafts extending from the differential passes along the outer periphery of the continuously variable transmission. Therefore, it is possible to provide a compact mechanical transmission unit to facilitate the application of the hydraulic/mechanical transmission device to front engine and front drive type and rear engine and rear drive type vehicles.

What is claimed is:

1. A hydraulic/mechanical transmission device, comprising:

a power dividing device including an input shaft and first and second output shafts for dividing a power supplied from a prime mover to said input shaft so as to transmit the power to both said output shafts;

a hydrostatic continuously variable transmission including a hydraulic pump driven by power delivered from said first output shaft, a hydraulic motor which is in communication with said hydraulic pump through a hydraulic closed circuit, and a control plate in which said hydraulic closed circuit is formed, at least one of said hydraulic pump and said hydraulic motor being of a variable displacement type;

a mechanical transmission device connected to said second output shaft; and a power collecting shaft for collecting power delivered from said mechanical transmission device and said hydraulic motor to supply the power to a load, wherein said input shaft and said first and second output shafts of said power dividing device are coaxially disposed, said first output shaft being coaxially connected to a pump cylinder block of said hydraulic pump, and said power collecting shaft being disposed parallel to said first and second output shafts and coaxially connected to a motor cylinder block of said hydraulic motor, and wherein a differential is connected to said power collecting shaft, said differential being disposed parallel to said power collecting shaft such that one of left and right wheel driving shafts extending from said differential passes along an outer periphery of said continuously variable transmission.

2. A hydraulic/mechanical transmission device according to claim 1, wherein said power dividing device, said mechanical transmission device and said power collecting shaft are accommodated in a common casing to constitute a mechanical transmission unit, said differential is accommodated in said casing of the mechanical transmission unit, and said control plate is disposed between said mechanical transmission unit and said hydraulic pump as well as said hydraulic motor for supporting said first output shaft and said power collecting shaft.

3. A hydraulic/mechanical transmission device, comprising:

a power dividing device having an input shaft and first and second output shafts;

a hydrostatic transmission having a hydraulic pump driven by said first output shaft, a hydraulic motor in hydraulic communication with said hydraulic pump;

a mechanical transmission device connected to said second output shaft;

a power collecting shaft provided for collecting power delivered from said mechanical transmission device and said hydraulic motor to supply the power to a load; wherein said input shaft and said first and second output shafts of said power dividing device are coaxially disposed, said first output shaft is coaxially connected to a pump cylinder block of said hydraulic pump, and said power collecting shaft is coaxially connected to a motor cylinder block of said hydraulic motor, and wherein a differential is operatively connected to said power collecting shaft, said differential being disposed parallel to said power collecting shaft such that one of left and right wheel driving shafts extending from said differential passes along an outer periphery of said hydrostatic transmission.

4. A hydraulic/mechanical transmission device according to claim 3, wherein said power dividing device includes a planetary gear device having a planetary carrier connected to said input shaft and first and second planetary gears joined together and rotatably mounted on said carrier, and said first and second planetary gears being meshed with first and second sun gears on said first and second output shafts, respectively.

5. A hydraulic/mechanical transmission device according to claim 3, wherein said power dividing device, said mechanical transmission device and said power collecting shaft are accommodated in a common casing to constitute a mechanical transmission unit, and a control plate of said hydrostatic transmission is disposed between said mechanical transmission unit and said hydraulic pump as well as said hydraulic motor for supporting said first output shaft and said power collecting shaft.

6. A hydraulic/mechanical transmission device according to claim 5, wherein said differential is accommodated in said casing of said mechanical transmission unit.

* * * * *